US005106669A

United States Patent [19]

Talvalkar et al.

[11] Patent Number: 5,106,669

[45] Date of Patent: Apr. 21, 1992

[54] MAGNETIC THERMAL TRANSFER RIBBON

[75] Inventors: Shashi G. Talvalkar, Kettering; Marion E. McCreight, Dayton; Thomas J. Obringer, Vandalia, all of Ohio

[73] Assignee: NCR Corporation, Dayton, Ohio

[21] Appl. No.: 641,845

[22] Filed: Jan. 16, 1991

Related U.S. Application Data

[62] Division of Ser. No. 377,656, Jul. 10, 1989, Pat. No. 5,047,291.

[51] Int. Cl.[5] .................... B32B 9/00

[52] U.S. Cl. .................... 428/195; 428/329; 428/422; 428/522; 428/900; 428/913; 428/914; 428/692

[58] Field of Search .................... 428/195, 329, 422, 522, 428/900, 913, 914, 692

[56] References Cited

U.S. PATENT DOCUMENTS

| | | |
|---|---|---|
| 3,663,278 | 5/1972 | Blose et al. . |
| 4,022,936 | 5/1977 | Miller . |
| 4,463,034 | 7/1984 | Tokunaga et al. . |
| 4,533,596 | 8/1985 | Besselman . |
| 4,581,283 | 4/1986 | Tokunaga et al. . |
| 4,600,628 | 7/1986 | Ishii et al. . |
| 4,617,224 | 10/1986 | Hotta et al. . |
| 4,628,000 | 12/1986 | Talvalkar et al. . |
| 4,690,858 | 9/1987 | Oka et al. . |
| 4,733,249 | 3/1988 | Iwamoto et al. . |
| 4,818,591 | 4/1989 | Kitamura . |

FOREIGN PATENT DOCUMENTS

| | | |
|---|---|---|
| 141678 | 5/1985 | European Pat. Off. . |
| 227093 | 7/1987 | European Pat. Off. . |
| 3634049 | 4/1987 | Fed. Rep. of Germany . |
| 3817323 | 12/1988 | Fed. Rep. of Germany . |
| 8604024 | 7/1986 | World Int. Prop. O. . |

*Primary Examiner*—Patrick J. Ryan
*Assistant Examiner*—Elizabeth Evans
*Attorney, Agent, or Firm*—George J. Muckenthaler

[57] ABSTRACT

A magnetic thermal transfer ribbon includes a substrate and a thermal sensitive coating which is a mixture and essentially consists of a fatty alcohol, a water base latex, an intensifying dye, an adhesive, and a surface agent along with iron oxide, and the coating mixture is dispersed in alcohol, in water, or in a combined water/alcohol mixture.

4 Claims, 1 Drawing Sheet

MAGNETIC THERMAL TRANSFER RIBBON

BACKGROUND OF THE INVENTION

In the printing field, the impact type printer has been the predominant apparatus for providing increased throughput of printed information. The impact printers have included the dot matrix type wherein individual print wires are driven from a home position to a printing position by individual and separate drivers. The impact printers also have included the full character type wherein individual type elements are caused to be driven against a ribbon and paper or like record media adjacent and in contact with a platen.

The typical and well-known arrangement in a printing operation provides for transfer of a portion of the ink from the ribbon to result in a mark or image on the paper. Another arrangement includes the use of carbonless paper wherein the impact from a print wire or a type element causes rupture of encapsulated material for marking the paper. Also known are printing inks which contain magnetic particles wherein certain of the particles are transferred to the record media for encoding characters in manner and fashion so as to be machine readable in a subsequent operation. One of the known encoding systems is MICR (Magnetic Ink Character Recognition) utilizing the manner of operation as just mentioned.

While the impact printing method has dominated the industry, one disadvantage of this type of printing is the noise level which is attained during printing operation. Many efforts have been made to reduce the high noise levels by use of sound absorbing or cushioning materials or by isolating the printing apparatus.

More recently, the advent of thermal printing which effectively and significantly reduces the noise levels has brought about the requirements for heating of extremely precise areas of the record media by use of fast response thin film resistors. The intense heating of the selective resistors causes transfer of ink from a ribbon onto the paper or like receiving substrate. Alternatively, the paper may be of the thermal type which includes materials that are responsive to the generated heat.

Further, it is seen that the use of thermal printing is adaptable for MICR encoding of documents wherein magnetic particles are caused to be transferred onto the documents for machine reading of the characters. The thermal transfer printing approach for use in MICR encoding of documents enables reliability in operation at the lower noise levels.

The use of thermal transfer printing, especially when performing a subsequent sorting operation, can result in smearing or smudging adjacent the printed symbols or digits on the receiving substrate. This smearing can make character recognition, such as OCR (Optical Character Recognition) or MICR (Magnetic Ink Character Recognition), difficult and sometimes impossible.

The present invention provides a magnetic thermal transfer medium in the preferred form of a ribbon which eliminates or substantially reduces smearing or smudging across or adjacent the printed digits or symbols during the sorting operation.

Representative documentation in the area of magnetic thermal transfer media includes U.S. Pat. No. 3,663,278, issued to J. H. Blose et al. on May 16, 1972, which discloses a thermal transfer medium having a coating composition of cellulosic polymer, thermoplastic resin, plasticizer and a sensible dye or oxide pigment material.

U.S. Pat. No. 4,022,936, issued to R. E. Miller on May 10, 1977, discloses a process for making a sensitized record sheet by providing a substrate, coating the substrate with an aqueous composition, and then drying the coating.

U.S. Pat. No. 4,463,034, issued to Y. Tokunaga et al. on Jul. 31, 1984, discloses a process for printing a magnetic image with a heat-sensitive magnetic transfer element that includes a foundation and a layer having a ferromagnetic substance powder meltable at 50°–120° C.

U.S. Pat. No. 4,533,596, issued to T. P. Besselman on Aug. 6, 1985, discloses a thermal magnetic transfer ribbon that includes a substrate and a coating containing resin, oil and wax in a binder mix which is dispersed with a magnetic pigment in a solvent solution.

U.S. Pat. No. 4,581,283, issued to Y. Tokunaga et al. on Apr. 8, 1986, discloses a heat-sensitive magnetic transfer element that includes a foundation and a layer having a melting temperature of 50°–120° C. and comprising a ferromagnetic substance powder, a wax and a resin.

U.S. Pat. No. 4,600,628, issued to F. Ishii et al. on Jul. 15, 1986, discloses a thermal transfer recording medium comprising a support, an interlayer containing a cross-linking agent, and a coloring agent layer containing a coloring agent and a reactive polymer.

U.S. Pat. No. 4,628,000, issued to S. G. Talvalkar et al. on Dec. 9, 1986, discloses a thermal transfer medium which includes a sucrose benzoate transfer agent and a coloring material or pigment.

U.S. Pat. No. 4,690,858, issued to H. Oka et al. on Sep. 1, 1987, discloses a thermal transfer sheet comprising a substrate and an ink layer having a sublimable dye, a binder of high molecular weight polyamide resin from dimer acid, and an organic solvent.

And, U.S. Pat. No. 4,818,591, issued to S. Kitamura on Apr. 4, 1989, discloses a thermal transfer recording medium comprising a support, a layer containing an aqueous emulsion of a heat-fusible substance, and a colorant layer comprising an aqueous emulsion of a resin and a colorant.

SUMMARY OF THE INVENTION

The present invention relates to nonimpact printing. More particularly, the invention provides a coating formulation or composition for use in making a thermal magnetic ribbon or transfer medium. The thermal transfer ribbon provides for imaging or encoding characters on paper or like record media documents and the formulation or composition enables machine reading of the imaged or encoded characters. The thermal magnetic transfer ribbon enables printing in quiet and efficient manner and makes use of the advantages of thermal printing on documents with a magnetic signal inducible ink.

Since the transferred digits or symbols which are created by means of thermal transfer technology, in effect, "sit" on the surface of the paper or media, a smearing of the ink of the digits or symbols is a major concern in the course of the document sorting operation.

The present invention is centered around a completely alcohol based system, a completely water based system, or a combined water/alcohol based system wherein water base latex is mixed with the water and/or alcohol in a single step process. The mixture in the form of a coating is applied to a substrate by well-known or conventional coating techniques and is put through a setting procedure by drying the coating at an elevated temperature.

The ribbon comprises a thin, smooth substrate such as tissue-type paper or polyester-type plastic on which is applied a thermal functional coating. The functional coating comprises a thermal transfer layer or coating which generally includes a basic formulation containing magnetic iron oxide, behenyl alcohol, a water base latex, and isopropyl alcohol. The water base latex is used as an adhesive and also assists the behenyl alcohol to transfer the iron oxide onto a plain piece of paper by means of heat or other thermal transfer mechanism.

In view of the above discussion, a principal object of the present invention is to provide a ribbon including a magnetic thermal-responsive coating thereon.

Another object of the present invention is to provide a ribbon including a thermal magnetic coating thereon for use in imaging or encoding operations.

An additional object of the present invention is to provide a magnetic coating on a ribbon having ingredients in the coating which are responsive to heat for transferring a portion of the coating to paper or like record media.

A further object of the present invention is to provide a magnetic coating on a ribbon substrate, which coating includes a magnetic pigment material and a fatty alcohol dispersed in a water base latex and which is responsive to heat for transferring the magnetic coating in precise printing manner to paper or like record media.

Still another object of the present invention is to provide a thermally-activated coating on a ribbon that is transferred from the ribbon onto the paper or document in an imaging operation in printing manner at precise positions and during the time when the thermal elements are activated to produce a well-defined and precise or sharp image.

Still an additional object of the present invention is to provide a thermal transfer layer consisting essentially of a fatty alcohol dispersed in a water base latex and wherein the layer is provided to prevent smearing of printed images or other marks.

Still a further object of the present invention is to provide a single step process which includes the preparation of a specific magnetic thermal transfer coating on a substrate for use in a sorting operation.

Still another object of the present invention is to provide a heat sensitive, thermal transfer ribbon created by use of a completely water based, a completely alcohol based, or a combined water/alcohol based coating or layer that is applied on a substrate and the coating or layer resists smearing or smudging of the transferred images or marks.

Additional advantages and features of the present invention will become apparent and fully understood from a reading of the following description taken together with the annexed drawing.

DESCRIPTION OF THE PREFERRED EMBODIMENT

Figure 1:
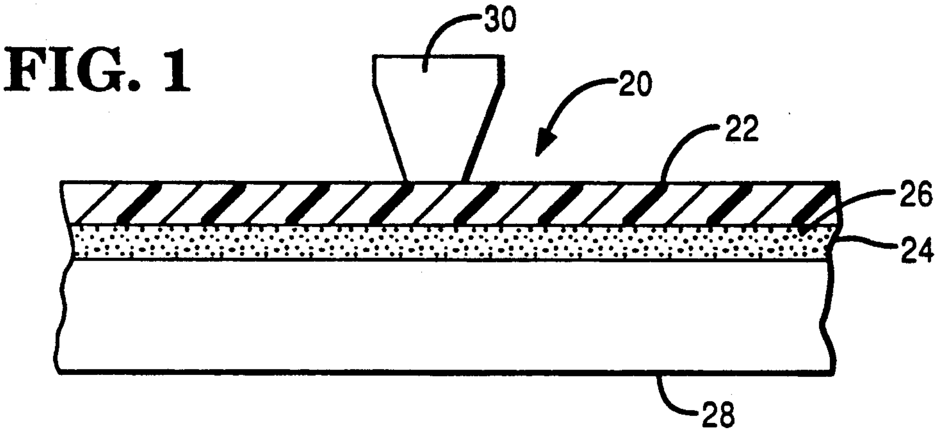
FIG. 1 illustrates a receiving document and a thermal element operating with a ribbon base having a magnetic thermal functional coating thereon incorporating the ingredients as disclosed in the present invention.
Figure 2:
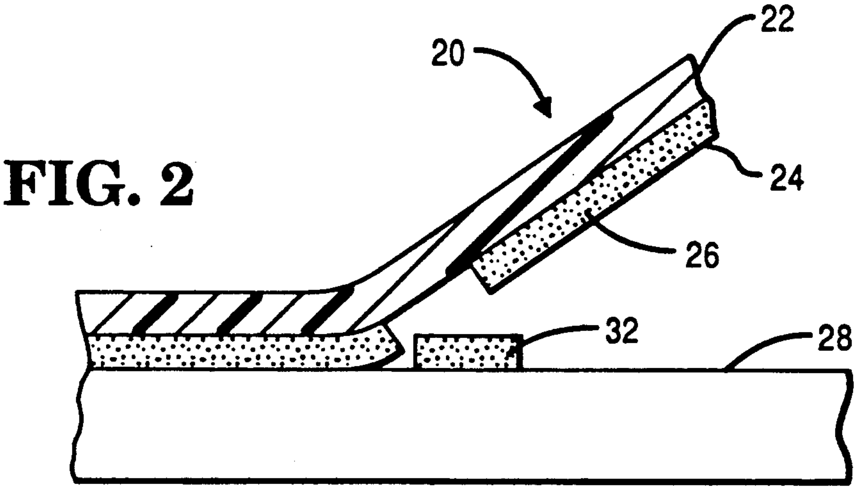
FIG. 2 shows the receiving document with a part of the coating transferred in the form of a digit, symbol or other mark onto the receiving document.

The transfer ribbon 20, as illustrated in FIGS. 1 and 2, comprises a base or substrate 22 of thin, smooth, tissue-type paper or polyester-type plastic or like material having a coating or layer 24 on the substrate. The coating 24 is thermally activated and includes magnetic pigment or particles 26 as an ingredient therein for use in imaging or encoding operations to enable machine reading of characters or other marks. Each character or mark that is imaged on a receiving paper document 28 or like record media produces a unique magnetic pattern or image that is recognized and read by the reader. In the case of ribbons relying on the magnetic thermal printing concept, the pigment or particles 26 include magnetic oxides or like sensible materials.

As alluded to above, it is noted that the use of a thermal printer having a print head element, as 30, substantially reduces noise levels in the printing operation and provides reliability in MICR imaging or encoding of paper or like documents 28. The magnetic thermal transfer ribbon 20 provides the advantages of thermal printing while encoding or imaging the document 28 with a magnetic signal inducible ink. When the heating elements 30 of a thermal print head are actuated, the imaging or encoding operation requires that the pigment or particles of material 26 in the coating 24 on the coated ribbon 20 be transferred from the ribbon to the document 28 in characters 32 for recognition by the reader.

The functional coating or layer 24 exhibits the following characteristics, namely, the coating must be resistant to rubbing and smudging, the coating must not inhibit transfer of the thermal-sensitive material 26 in the coating 24 at normal print head voltage, pulse width and temperature, and the coating 24 must allow a bond of the magnetic thermal-sensitive material 26 in the coating 24 onto the paper 28 upon transfer of such material.

A preferred formulation to satisfy the above characteristics of the magnetic thermal functional coating 24 includes the ingredients in appropriate amounts as set forth in Example I.

EXAMPLE I

| Ingredient | % Dry | Dry Wt. | Wet Wt. | % Dry Range |
|---|---|---|---|---|
| BASF OXIDE 0045 | 48.0 | 144.0 | 144.0 | 40.0–55.0 |
| Behenyl Alcohol | 41.0 | 123.0 | 123.0 | 30.0–50.0 |
| Latex EC-1052 (40%) | 7.0 | 21.0 | 52.5 | 5.0–10.0 |
| Butvar B98 | 2.0 | 6.0 | 6.0 | 1.0–3.0 |
| Basonyl Black X-22 (50%) | 1.5 | 4.5 | 9.0 | 1.0–2.0 |
| PTFE SST-3 | 0.5 | 1.5 | 1.5 | 0.5–1.5 |
| N-Propanol | — | — | 464.0 | |
| | 100.0 | 300.0 | 800.0 | |

It is to be noted that Latex EC-1052 is supplied at 40% solids and that Basonyl Black X-22 is supplied at 50% solids. The Latex EC-1052 may be supplied in a range of 38 to 42% solids and the Basonyl Black X-22 may be supplied in a range of 48 to 52% solids dependent upon different suppliers. The amount of N-propanol in the formulation is selected to suit the range of solids of the various ingredients. It is also noted that the percentage of solids in the formulation of Example I is 37.5%.

Example II provides another formulation of different ingredients and amounts thereof as follows:

EXAMPLE II

| Ingredient | % Dry | Dry Wt. | Wet Wt. | % Dry Range |
|---|---|---|---|---|
| Magnetic Oxide | 48.0 | 126.0 | 126.0 | 40.0–55.0 |
| Behenyl Alcohol | 40.0 | 105.0 | 105.0 | 35.0–50.0 |
| Latex EC-1052 (40%) | 11.5 | 30.2 | 75.5 | 7.0–13.0 |
| Surfynol PC | 0.5 | 1.3 | 1.3 | 0.01–0.5 |
| Isopropyl Alcohol | 0.0 | — | 442.2 | |
| | 100.0 | 262.5 | 750.0 | |

It is noted that the percentage of solids in the formulation of Example II is 35%. The amount of isopropyl alcohol in the formulation is selected to suit the range of solids of the various ingredients.

Example III is a water base formulation having ingredients and amounts as follows:

EXAMPLE III

| Ingredient | % Dry | Dry Wt. | Wet Wt. | % Dry Range |
|---|---|---|---|---|
| Magnetic Oxide | 42.0 | 100.8 | 100.8 | 40.0–55.0 |
| Latex EC-1052 (40%) | 10.0 | 24.0 | 60.0 | 7.0–13.0 |
| CMC 7L (3%) | 3.0 | 7.2 | 240.0 | 1.0–5.0 |
| Irganox 1076 | 2.0 | 4.8 | 4.8 | 1.0–3.0 |
| Armoslip 18 | 12.0 | 28.8 | 28.8 | 9.0–16.0 |
| Behenyl Alcohol | 12.0 | 28.8 | 28.8 | 10.0–17.0 |
| Sucrose Benzoate | 18.0 | 43.2 | 43.2 | 15.0–21.0 |
| Surfynol PC | 1.0 | 2.4 | 2.4 | 0.5–1.0 |
| Potable Water | — | — | 291.2 | |
| | 100.0 | 240.0 | 800.0 | |

It is noted that CMC 7L is prepared at 3% solids in a preferred formulation, however, the CMC 7L may be prepared at 2 to 10% solids. It is also noted that the amount of potable water in the formulation is selected to suit the range of solids of the various ingredients, and that the percentage of solids in the formulation of Example III is 30%.

Example IV is another formulation of different ingredients and amounts as follows:

EXAMPLE IV

| Ingredient | % Dry | Dry Wt. | Wet Wt. | % Dry Range |
|---|---|---|---|---|
| Magnetic Oxide | 48.0 | 120.0 | 120.0 | 40.0–55.0 |
| Behenyl Alcohol | 41.0 | 102.5 | 102.5 | 35.0–50.0 |
| Latex EC-1052 (40%) | 7.0 | 17.5 | 43.8 | 5.0–15.0 |
| PVP | 2.0 | 5.0 | 5.0 | 1.0–3.0 |
| PTFE SST-3 | 0.5 | 0.25 | 1.2 | 0.5–2.0 |
| Basonyl Black X-22 (50%) | 1.5 | 3.75 | 7.5 | 1.0–3.0 |
| Potable Water | — | — | 70.0 | |
| N-Propanol | — | — | 400.0 | |
| | 100.0 | 250.0 | 750.0 | |

It is noted that while the ratio of potable water to N-propanol is 15 to 85, the water content can be as much as 50% of the mixture. The amount of the water and N-propanol in the formulation is selected to suit the range of solids of the various ingredients. It is also noted that the percentage of solids in the formulation of Example IV is 33.3%.

Example V is another formulation of different ingredients and amounts as follows:

EXAMPLE V

| Ingredient | % Dry | Dry Wt. | Wet Wt. | % Dry Range |
|---|---|---|---|---|
| BASF Oxide #0045 | 48.0 | 120.0 | 120.0 | 40.0–55.0 |
| Behenyl Alcohol | 34.0 | 85.0 | 85.0 | 30.0–40.0 |
| Rice Bran Wax | 5.0 | 12.5 | 12.5 | 3.0–7.0 |
| Latex EC 1052 (40%) | 7.0 | 17.5 | 43.8 | 5.0–12.0 |
| Butvar B98 | 2.0 | 5.0 | 5.0 | 1.0–4.0 |
| Sucrose Benzoate | 2.0 | 5.0 | 5.0 | 1.0–3.0 |
| Basonyl Black X-22 (50%) | 1.5 | 3.8 | 7.5 | 1.0–3.0 |
| Tyzor TBT | 0.5 | 1.2 | 1.2 | 0.5–1.0 |
| N-Propanol | — | — | 470.0 | |
| | 100.0 | 250.0 | 750.0 | |

It is noted that the amount of N-propanol in the formulation is selected to suit the range of solids of the various ingredients. It is also noted that the percentage of solids in the formulation of Example V is 33.3%.

And, Example VI is a formulation of different ingredients and amounts as follows:

EXAMPLE VI

| Ingredient | % Dry | Dry Wt. | Wet Wt. | % Dry Range |
|---|---|---|---|---|
| BASF Oxide #0045 | 48.0 | 108.0 | 108.0 | 40.0–55.0 |
| Behenyl Alcohol | 40.0 | 90.0 | 90.0 | 30.0–50.0 |
| Rice Bran Wax | 11.5 | 25.9 | 25.9 | 10.0–15.0 |
| Tyzor TBT | 0.5 | 1.1 | 1.1 | 0.1–1.0 |
| N-Propanol | — | — | 525.0 | |
| | 100.0 | 225.0 | 750.0 | |

It is noted that the amount of N-propanol in the formulation is selected to suit the range of solids of the various ingredients. It is also noted that the percentage of solids in the formulation of Example VI is 30%.

In the overall practice of the invention, it is desired to provide formulations for the coating 24 of the ribbon 20 which formulations exhibit exceptional resistance to smear in a high speed sorting operation. It has been observed from the use of these formulations that low buildup of the coating or residue occurs on the stainless steel foil which protects the read and write head in a high speed sorter. A further reduction or lowering of buildup has been observed with the use of the polyvinyl pyrrolidone which has common solubility in water and alcohol. The polyvinyl pyrrolidone is incorporated into the formulation of Example IV to improve the coating properties or characters of the thermal transfer ribbon in printing operations without sacrificing the transferrability of the thermal sensitive material 26 in the coating 24 or the resistance to smear or smudge.

A further improvement in increasing the smear resistance is accomplished by use of an organic titanate, such as Tyzor TBT (tetrabutyl titanate) in Examples V and VI. The tetrabutyl titanate undergoes an alcoholysis reaction in conjunction with the behenyl alcohol. A typical alcoholysis reaction is as follows:

$$Ti(OR)_4 + 4R'OH \rightleftharpoons Ti(OR')_4 + 4ROH$$

The Tyzor titanates crosslink polymers through the active hydrogens of hydroxyl, amino, amido, carboxyl and thio groups.

If ROH is more volatile than R'OH, the ROH may be removed by evaporation or distillation, shifting the equilibrium to the right, and converting all the R'OH to $Ti(OR')_4$. This reaction is sometimes called ester interchange of a titanate since the alkyl groups in an ester of ortho titanic acid are interchanged. Hydroxy crosslinking is a form of alcoholysis. If R'OH is a high molecular weight alcohol, such as behenyl alcohol which has a molecular weight of 326, and includes a film forming substance, such as the EC-1052 latex or the polyvinyl pyrrolidone, the same alcoholysis reaction takes place. Carboxylic acidolysis takes place in a similar manner as follows:

$$Ti(OR)_4 + {-}OH \longrightarrow {-}O{-}Ti(OR)_3 + ROH$$

and $$-O-Ti(OR)_3 + HO- \longrightarrow -O-\underset{\displaystyle OR}{\overset{\displaystyle OR}{TI-O}}- + ROH$$

The organic titanate is convenient to include in the grinding process of the various ingredients of the coating 24 in a particle size reduction apparatus, such as a ball mill or an attritor.

In the process of drying the thin layer of the coating 24 under an elevated heat (160°-200° F.) a crosslinking reaction takes place and an organic titanate chelate is formed. The titanate can also react with a variety of resins containing carboxyl and hydroxyl groups which undergo a crosslinking reaction. It is further noted that under elevated heat, such as that generated in a thermal transfer printing process, additional crosslinking is believed to take place, thereby providing better heat resistance to the transferred image with increased hardness property, and increased resistance to smear.

The transfer property of the coating 24 can also be improved by use of adhesives such as the Butvar B98 (Examples I and V), polyvinyl alcohol, cellulose acetate butarate or water base emulsions of vinyl acetate.

In the preparation of the magnetic thermal transfer ribbon 20, the formulation layer 24 is coated on the substrate 22. The substrate or base 22, which may be 14 to 35 gauge polyester film, as manufactured by du Pont under the trademark Mylar, or 30 to 40 gauge capacitor tissue, as manufactured by Glatz, should have a high tensile strength to provide for ease in handling and coating of the substrate. Additionally, the substrate should have properties of minimum thickness and low heat resistance to prolong the life of the heating elements 30 of the thermal print head by reason of reduced print head actuating energy.

The coating 24 is applied to the substrate 22 by means of conventional coating techniques such as a Meyer rod or like wire-wound doctor bar set up on a typical coating machine to provide a coating weight of between 5.5 and 8.5 grams per square meter. The coating is made up of approximately 30 to 37.5% nonvolatile material and is maintained at a desired temperature and viscosity throughout the coating process. After the coating is applied to the substrate, the web of ribbon is passed through a dryer at an elevated temperature in the range between 93 and 150 degrees C. for approximately 5-10 seconds to ensure good drying and adherence of the coating 24 onto the substrate 22 in making the transfer ribbon 20. The above-mentioned coating weight, as applied by the Meyer rod onto a preferred 9-12 microns thick capacitor grade tissue, translates to an overall total thickness of 10-20 microns. The coating 24 exhibits exceptional transfer characteristics on a variety of paper stocks at print energy level ranges of 0.80 to 1 20 mJ of print energy in the thermal transfer encoder.

The magnetic iron oxide is a reddish or bluish-black amorphous powder in form and magnetic in function, is insoluble in water, alcohol and ether, and is used as a pigment or sensible material. Behenyl alcohol is a long chain, saturated fatty alcohol of high molecular weight (326) which is soluble in a hot alcohol, acetone and ether, and is used as a transfer agent. Latex EC 1052 is a water base latex which is used as an adhesive and which also assists the transfer and binding of the magnetic iron oxide onto the paper 28. The latex is further identified as an aqua vinyl primer having a pH of 8.2 to 8.5 and a viscosity of 25 to 30 inches. Butvar B98 is a polyvinyl acetate resin (further identified as polyvinyl butyral) and is used as an adhesive to adjust the transfer characteristics of the coating 24. The polyvinyl acetate resin imparts improved flexibility, adhesion, cohesion, toughness and rubproofness. The solubility characteristics of Butvar allow compounding with fast drying solvents suitable for high speed printing. Basonyl black X-22 is an azine dye in N-propanol which is used to improve the intensity of the transferred image without sacrificing smear resistance. The Basonyl Black X-22 also improves the adhesion of the coating 24 to the substrate 22. PTFE is a polymer, plastic or resin derived from tetrafluoroethylene, is a straight chain unit, has a waxy texture, and is opaque with a milk-white color. Surfynol PC is an organic surface-active material used as a wetting agent. CMC 7L is defined as sodium carboxymethylcellulose and is a synthetic cellulose gum containing 0.4 to 1.5 sodium carboxymethyl groups per glucose unit of cellulose. Irganox 1076 is a low melting point (50°-55° C.) hydracinnamate of phenolic resin used as an antioxident. Armoslip 18 is an amide wax. Sucrose benzoate is a plasticizer modifier used as a transfer agent. PVP (polyvinyl pyrrolidone) is a free flowing white amorphous powder and is soluble in water, chlorinated hydrocarbons, alcohols, amines, nitroparaffins, and lower molecular weight fatty acids. Rice bran wax is from bran that has been removed from the rice, and the wax is a hard, dry, slightly crystalline flake or powder. Tyzor TBT is an alkyl having a formula weight of 340, is a pale yellow liquid, has a specific gravity of 0.99, and effect of water is very rapid hydrolysis.

The availability of the various ingredients used in the present invention is provided by the following list of companies.

| Material | Supplier |
|---|---|
| Iron Oxide #0045 | BASF |
| Behenyl Alcohol | Fallak Chemical |
| Latex EC-1052 (40% Solids) | Environmental Ink Co. |
| Butvar B98 | Monsanto |
| Basonyl Black X-22 (50% Solids) | BASF |
| PTFE SST-3 | Diamond Shamrock |

-continued

| Material | Supplier |
|---|---|
| Surfynol PC | Airco Products |
| CMC 7L (35% Solids) | Hercules |
| Irganox 1076 | Ciba-Geigy |
| Armoslip 18 | Armak Chemical |
| Sucrose Benzoate | Velsicol |
| PVP | GAF |
| Rice Bran Wax | Frank B. Ross Co. |
| Tyzor TBT | du Pont |

The water or alcohol used as solvents along with the various other ingredients in the present formulations enable the producing of a magnetic thermal transfer ribbon which exhibits resistance to smear and scratch of the transferred image. The N-propanol, the isopropyl alcohol and the potable water are provided by any known supplier. While potable water is acceptable for use in the present invention, deionized water (that which has been purified of salts) is readily available for use in these formulations, or distilled water (that which is void of nonionic impurities) may also be used.

The present invention provides a water base thermal transfer system that does not require the use of a conventional wax. The behenyl alcohol and the water base latex are used as transfer agents. The combination of the water base latex and the behenyl alcohol provides a transfer agent which exhibits exceptional resistance to smear and demonstrates low buildup of residue on the stainless steel foil in a high speed sorter. The organic titanate is used to improve the scratch and smear resistance of the transferred image. The rice bran wax is used to improve the scratch resistance of the transferred image. The rice bran wax is also used as an adhesive to assist the latex in the transfer process. The basonyl black is used to improve the intensity of the transferred image without sacrificing smear resistance, and is also used to improve the adhesion and the rheological (flow of matter) properties of the coating 24. It is also within the scope of the invention to provide an emulsion of sucrose benzoate, behenyl alcohol, and latex wherein heat is used to create the emulsion in a water/alcohol medium and to disperse the magnetic iron oxide without the use of a conventional grinding process.

It is thus seen that herein shown and described is a thermal transfer ribbon for use in thermal printing operations which includes a thermal responsive coating on one surface of the ribbon. The coated ribbon enables transfer of coating material onto documents or like record media during the printing operation to form digits or symbols or other marks on the record media in an imaging or in an encoding nature, permitting machine or other reading of the characters. The thermal responsive coating includes a formulation or mixture of ingredients which resist smearing or smudging and scratching of the transferred images or other marks. The mixture or formulation of the various ingredients is dispersed in water, alcohol, or a combined water/alcohol solvent. In the formulations which include Butvar B98 (Examples I and V), it is preferred to use N-propanol as the solvent.

The present invention enables the accomplishment of the objects and advantages mentioned above, and while a preferred embodiment has been disclosed herein, variations thereof may occur to those skilled in the art. It is contemplated that all such variations and any modifications not departing from the spirit and the scope of the invention hereof are to be construed in accordance with the following claims.

What is claimed is:

1. A thermal transfer ribbon comprising a substrate and a thermal sensitive coating which is formed from a mixture consisting essentially of a behenyl alcohol, a rice bran wax, an organic titanate, and magnetic iron oxide, the mixture being dispersed in a solvent solution.

2. The thermal transfer ribbon of claim 1 wherein the mixture is dispersed in isopropyl alcohol.

3. The thermal transfer ribbon of claim 1 wherein the mixture is dispersed in portable water.

4. The thermal transfer ribbon of claim 1 wherein the mixture is dispersed in N-propanol.

* * * * *